(12) United States Patent
Gagnon et al.

(10) Patent No.: US 6,421,648 B1
(45) Date of Patent: Jul. 16, 2002

(54) DATA PROCESSING SYSTEM FOR THE MANAGEMENT OF A DIFFERENTIAL CONTINUOUS COMPENSATION PLAN

(76) Inventors: Louis Gagnon; Yann Valay, both of 2259 Avenue Papineau, Montréal Québec (CA), H2K 4J5

( * ) Notice: Subject to any disclaimer, the term of this patent is extended or adjusted under 35 U.S.C. 154(b) by 0 days.

(21) Appl. No.: 09/290,882

(22) Filed: Apr. 14, 1999

(51) Int. Cl.[7] ............................................. G06F 17/60
(52) U.S. Cl. ............................................. 705/1; 705/10
(58) Field of Search ............................. 705/1, 10, 14, 705/7

(56) References Cited

U.S. PATENT DOCUMENTS

| | | |
|---|---|---|
| 4,949,256 A | 8/1990 | Humble |
| 5,025,372 A | 6/1991 | Burton et al. |
| 5,202,826 A | 4/1993 | McCarthy |
| 5,537,314 A | 7/1996 | Kanter |
| 5,734,838 A | 3/1998 | Robinson et al. |
| 6,134,533 A * | 10/2000 | Shell ............................. 705/26 |

FOREIGN PATENT DOCUMENTS

WO     WO-200148669 A1 *  7/2001  ........... G06F/17/60

OTHER PUBLICATIONS

Chen, J., "A Simplified Integer Programming Approach to Resource Allocation and Profit," Accounting and Business Research, Autumn 1993, vol. 13, issue 52, p. 273.*

* cited by examiner

*Primary Examiner*—Tariq R. Hafiz
*Assistant Examiner*—Marc Norman
(74) *Attorney, Agent, or Firm*—Robert Brouillette; Ronald S. Kosie

(57) ABSTRACT

A data processing system is provided for monitoring and recording the information flow and data, and making all calculations necessary for maintaining a Differential Continuous Compensation Plan (hereinafter referred to as "DCCP") for participants to a Multi-Level Marketing approach (hereinafter referred to as "MLM"). MLM is defined as "an approach that remunerates participants for the purchases made by the people that they directly and indirectly introduced to particular products and/or services (hereinafter referred to as "offer")".

7 Claims, 3 Drawing Sheets

FIGURE 2

1. CALCULATION OF VOLUME $$V_\lambda^\mu = v_\lambda + \sum_{i=1}^{i=N_\lambda} V_i^\lambda$$

2. CALCULATION OF VALUE $$F(V_\lambda^\mu) = M(V_\lambda^\mu) \, V_\lambda^\mu$$

3. CALCULATION OF REVENUE $$P(V_\lambda^\mu) = F(V_\lambda^\mu) - \sum_{i=1}^{i=N_\lambda} F(V_i^\lambda)$$

DATA PROCESSING SYSTEM FOR THE MANAGEMENT OF A DIFFERENTIAL CONTINUOUS COMPENSATION PLAN

BACKGROUND OF THE INVENTION

1. Field of the Invention

This invention relates generally to the field of data processing systems for the management of compensation plans used by merchants who use Network Marketing or Multi-Level Marketing (MLM) as a marketing approach. In this document, Network Marketing or MLM is defined as "an approach that remunerates participants for the purchases made by the people that they directly and indirectly introduced to particular products and/or services." Note that, in order to take into account the latest trends brought by the intensive use of computer technology, this definition of MLM covers both models where participants physically distribute products and where they do not (no matter the names or legal status that participants are given).

2. Description of Prior Art

Thirty years of marketing literature (product diffusion theory in particular) has abundantly documented the natural existence and the strategic importance of the consumers' word-of-mouth. Word-of-mouth is the most effective form of commercial communication because it is timely, culturally adapted and interactive. Every day, it presides over a great number of marketing successes and failures. In fact, positive word-of-mouth is actually what mass marketers are seeking to generate when they define specific product positioning that they communicate through mass communications, mass distribution and packaging.

As a marketing approach, MLM aims at the same goal as mass marketing: create and keep a customer base for a specific offer. To do this, mass marketing companies try to create the social conditions for people to want to communicate their offer for free while MLM companies offer the people the possibility to be remunerated to communicate and distribute the offer to other people who will, in turn, do the same.

In order to be translated into a commercial success, word-of-mouth (natural or remunerated) requires the participation of a growing number of individuals. As opposed to what is expected of a traditional salesperson, one expects that an MLM participant does more than introduce the offer to end-consumers. In fact, one expects that a participant find other participants who, in addition to buying the offer, diffuse both the offer and the opportunity to other people around them. The very fact that more and more people accept to diffuse the offer and the opportunity ensures that, in the end, the offer reaches a large portion of the potential customers. In addition to necessitate a growing number of participants, MLM must deal with one normal economic constraint: the price at which a particular offer can be competitively sold sets a maximum margin that a company can give to those who contributed directly or indirectly to the end-sale. Combining this economic constraint with the nature of word-of-mouth, one realises the challenge that MLM must address in order to be effective: "it must divide up a fixed margin among a growing number of participants while motivating them to introduce more people to the offer over time".

In order to remunerate people, MLM companies must trace the diffusion of the opportunity (which participant has introduced which participants) and the purchases of every participants. Such data is collected, stored and exploited thanks to computerized data processing systems. The precise exploitation of the data is defined by the compensation plan that determines exactly how the word-of-mouth is remunerated. To date, a plethora of MLM compensation plans have been developed. In the following paragraphs, we will introduce the idea that they come from two families of plans and we will explain why they fail to address the above MLM challenge.

A first family of plans can be seen as "Non-Differential". This family of plans includes compensation plans commonly known as Unilevels, Matrix and Binaries (30% of MLM compensation plans in existence today). All Non-Differential plans remunerate participants by offering predetermined margins on the business volume of a predetermined number of levels of downline (i.e. a number of generations directly and indirectly introduced to the offer by a particular participant). In Example 1 below, we illustrate the principle common to Non-Differential compensation plans.

EXAMPLE 1

Illustration of the Principle of Non-Differential Compensation Plans

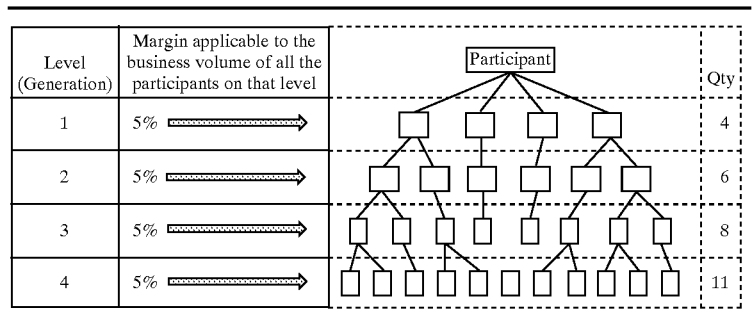

| Level (Generation) | Margin applicable to the business volume of all the participants on that level | Qty |
|---|---|---|
| 1 | 5% | 4 |
| 2 | 5% | 6 |
| 3 | 5% | 8 |
| 4 | 5% | 11 |

In Example 1, the total margin to be redistributed is 20% (5%+5%+5%+5%) and the number of levels on which it is applied is 4. Note that the margin to be applied can vary from one level to the other (e.g. 2%+1%+7%+10%) and that the number of levels can theoretically be as high as infinity.

According to Example 1, if a participant has 4 participants on his level 1, 6 on his level 2, 8 on his level 3 and 11 on his level 4, and if each participant purchase $10 during a particular period, the compensation for that period is calculated as follows: (4×$10×5%)+(6×$10×5%)+(8×$10×5%)+(11×$10×5%)=14.50.

For a given number of downline participants who purchase a given quantity of product/services, Non-Differential systems pay out as much money to a participant who personally introduced only one person (small individual effort) as it does to a participant who personally introduced tens of people (big individual efforts). As illustrated below, let's assume that our participant in Example 1 had the same number of participants in 4 downline levels (same business volume) but that his individual effort is four times less. For example, let's assume he personally sponsored 1 participant, who sponsored 9 participants who collectively sponsored 8 participants who sponsored 11 participants.

Under this scenario where he does not perform individually, the compensation of our participant for that period is ($10×5%)+(9×$10×5%)+(8×10×5%)+(11×$10×5%)=$14.50 which is exactly the same as when he personally introduced 4 people.

Example 1A
Two Possible Sponsoring Scenarios According to Example 1 this stage). A participant's net discount (margin) is the result of a subtraction between that participant's discount and the discounts applicable to those that s/he personally introduced (first downlines). In Example 2 below, we illustrate the kind of discount table common to Stair-Step Differential components in SSBA plans.

EXAMPLE 2

Illustration of a Discount Table for Stair-Step Differential Component in SSBA Plans

| Group Business Volume | Discounts |
|---|---|
| $4,500 and more | 25% |
| $3,000–$4,499 | 20% |
| $1,800–$2,999 | 15% |
| $800–$1,799 | 10% |
| $300–$799 | 5% |
| $100–$299 | 3% |

Note that the number of brackets, the level of group business volumes (limits of each bracket) and the applicable margins vary according to the operator's constraints and

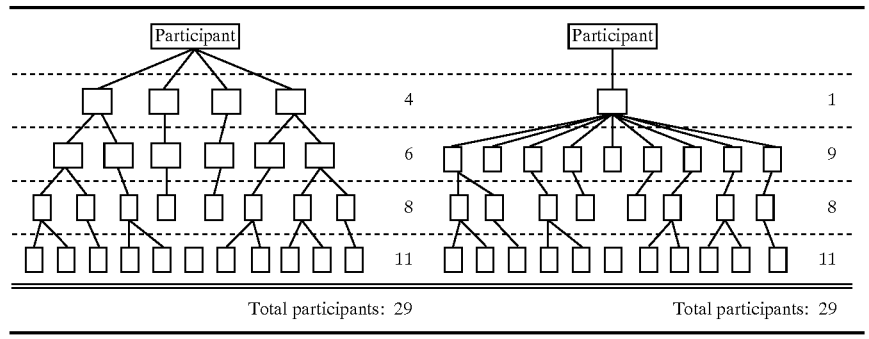

Total participants: 29    Total participants: 29

Obviously, such plans do not effectively address MLM's challenge to divide Lup this 20% fixed margin among a growing number of participants while motivating them to introduce more people. As rational economic agents, people tend to optimize their ratio "Potential Gains/Effort". Since the "Effort" rows faster than the "Potential Gain" when one introduces people who are not in one's intimate social circle, the natural tendency'is to introduce the offer to a few and hope that they themselves build a large group of participants. All other things being, equal, the money given to participants who do not make significant individual efforts is not available to be given to those who make significant individual efforts. Doing so, Non-Differential plans fail to effectively motivate participants to make more efforts.

Approximately 70% of MLM compensation plans in existence today belong to a second family of plan that can be considered as Semi-Differential. Those plans are commonly known as Stair-Step/Break Aways ("SSBAs"). They are considered Semi-Differential because they use a two-pronged method to calculate the compensation of participants. First, they use a "Stair-Step" Differential method and then they switch to a Non-Differential method (similar to the one described above) commonly called "Break Away".

The Stair-Step Differential component of SSBAs consists of providing participants with a discount table that associates a limited number of discount levels (margin) to different brackets of business volume purchased by a participant's entire downline or group (no limit in the number of levels at resources. Generally, Stair-Step Differential tables consists of less than ten brackets and gives maximum margins of between 15% and 50% of business volume.

Using the table in Example 2, we can illustrate how the Stair-Step Differential component of the SSBA calculation works. If a participant has a group business volume of $300 and if (s)he has 2 first level downline participants with group business volumes of $100 each, his/her compensation is ($300×5%)−($100×3%)−($100×3%)=$9.

As clearly illustrated by the table in Example 2, the relationship between the margin (discount) and the group business volume can be seen as a Stair-Step mathematical function where the same margin is given to everyone within a certain volume bracket. In Example 2, 10% margin is given to every participant with a group business volume within $800 and $1,799.

As Non-Differential plans, Stair-Step Differentials present serious problems of effectiveness in remunerating for the effect of one's word-of-mouth. In the case where participant A has personally introduced participant B (first downline), a Stair Step discount Table makes it possible for B to increase his/her group business volume so as to reach the same discount bracket as A. In such case, A's net remuneration decreases even if B introduced more participants who bought more products. In Example 2, if our participant's group business volume grows from $300 to $500 because one of his/her two first level downlines has increased his/her group business volume from $100 to $300, his/her compensation decreases from $9 to $7 ($500×5%)−($300×5%)−($100×3%). In short, Stair-Step Differential function cannot guarantee that a gain in business volume will compensate for a loss in differential margin.

Another serious problem of Stair-Step functions is that, ultimately, every participant's first level downline participants will reach the highest level of the table as their groups develop. Doing so, participants are condemned to make no differential of margin on their group's business volume exception made of their personal purchases. With a view to solve this major inadequacy, SSBA plans complete their method with so-called "Break Aways" that allow participants to break away from the table after they reach the top margin. At that time, participants are paid a predetermined margin on a predetermined number of levels in a fashion similar to the one described for Non-Differential plans. This additional compensation plan is also referred to as "bonus plan", "override bonus plan", "performance bonus plan", etc.

As briefly shown in the above paragraphs, both Non-Differential and Stair-Step Differential methods are ineffective in consistently and naturally remunerating participants who make more individual efforts to increase their group's business volume. This leads to motivation problems and explains why MLM companies have linked the payment of compensations to collective and individual performance conditions. Such conditions are meant to force participants to perform so that the system can be economically viable. In short, conditions set a minimum level of purchase plus a series of downlines performance levels to which pre-determined margins are allocated for a pre-determined number of levels. Generally, a specific level of performance corresponds to a specific title in a hierarchy. There are as many hierarchic titles as there are levels of performance. Titles refer to precious stones, business positions, army positions, etc. Generally, the acquisition of an upper title (which provides the same margin to more levels or a higher margin to the same levels) is conditional upon one having developed (among one's downline) so many participants who carry the titles immediately below. Conditional systems work in a Russian puppet fashion whereby a higher level of conditions includes the lower level of conditions that includes the lower level of conditions and so on. Such systems quickly become mind boggling and impossible to understand for the layperson.

In addition to adding an enormous amount of complexity, conditions introduce their own inefficiencies. First, they exclude the compensation of the very real efforts of people who did not achieve minimal thresholds of performance. They also tend to de-motivate those who could do more than a particular level of conditions without reaching the next level. Finally, conditions bring the possibility that people try to artificially fulfil them by registering dummy participants and having them purchase unwanted quantities of products with a view to fulfil short term requirements.

In conclusion, all of the compensation plans that have been developed by MLM companies to date fail to address the effectiveness challenge of MLM. Both Non-Differential and Stair-Step/Break-Away plans cannot guarantee that, over time, a participant will consistently make more money if and when his/her downlines generate more sales. Such ineffectiveness has justified the introduction of performance conditions. Below, we argue that those conditions have very negative consequences for participants and therefore, for the reputation of MLM as a marketing approach.

As indicated above, the introduction of performance conditions makes existing MLM compensation plans extremely complex for the layperson to understand. In fact, most participants in today's MLM industry do not fully understand and are, in turn, incapable to explain their compensation plans to others. Yet the capacity to explain compensation is key to interesting others to participate in MLM. Common sense suggests that one will be motivated to participate when one understands how one makes money.

The tremendous complexity of existing MLM compensation plans led the industry to create expensive and time-consuming training and motivation materials. In order to participate in an MLM opportunity, potential participants must generally purchase a business kit that includes information about the company, its leaders, the offer, the MLM concept, sales techniques and the compensation plan. No matter how voluminous they might be, business kits are usually insufficient to properly train people and therefore, they do not dispense participants to attend regular training and motivation sessions/seminars. It is therefore surprising to see that during such seminars, the emphasis is not put on explaining the intricacies of the compensation plan but rather on showing that "ordinary folks" have made and continue to make money with the system. Business kits are usually sold for between $10 and $400 and new participants are encouraged to attend regular, often weekly seminars where they can bring their potential recruits.

In today's MLM industry, participants are required to spend significant amount of money, time and efforts in order to participate. The tricky part is that such investment must be made prior to being in a position to judge the potential return of participation and it constitutes no less than a serious entry barrier for the layperson. Indeed, not everyone is willing to spend hundreds of dollars and tens of hours in order to have the opportunity to be remunerated for one's word-of-mouth effect . . . Especially if the compensation plan is too complex to be explained and if the compensation itself is tied up to obligations to buy and perform. In fact, the majority of active participants in such systems are small entrepreneurs and this is why the MLM industry has traditionally been limited to this very small segment of the population.

Beyond the market limitation for the operator, participant's investment in money, time and effort have further and graver consequences. In fact, the required investment constitutes negative equity for participants until they have been remunerated up to the required level. In today's MLM industry, approximately 8 participants out of 10 abandon within one year of participation and since they have wasted time, money and efforts, these people actively propagate a negative image of MLM. Those who continue participating might try to cut their losses by adopting a sectarian attitude and by putting unnecessary pressure on their peers. Such practices fully justify the bad reputation of a legitimate and otherwise well-intentioned industry. Such practices could be avoided and attrition rates could be reduced very drastically if existing compensation plans were effective in meeting MLM's challenge to divide up a fixed margin among a growing number of participants while motivating them to introduce more people over time.

OBJECT AND ADVANTAGES

The Differential Continuous Compensation Plan or DCCP data processing system of the invention is effective in meeting MLM's challenge, i.e. it naturally motivates its participants to perform word-of-mouth. Doing so, unlike existing MLM plans, it does not need to add layers of pay out conditions in order to ensure minimal individual and collective performance. The simplicity brought by the application of DCCP renders MLM simple enough for the layperson to understand and to communicate to others. Indeed, the approach and its methods can be explained on a single leaflet that makes participants fully autonomous. Consequently, unlike existing MLM plans, participants to DCCP do not have to spend money, time and effort in training and motivation. Since participants have nothing to lose and everything to gain in participating, the system is not limited to a small segment of entrepreneurs (people who have money and time to invest in a small business venture). Since DCCP is offering great potential gains (to be paid forever) in exchange of a small effort (no monetary investment, little time investment to be made once) it can truly be geared towards the operator's entire population of potential customers. Since every potential customer is concerned, DCCP becomes an additional product/service feature, a significant source of competitive advantage. For the first time ever, the DCCP data processing system provides businesses with the means to effectively remunerate those ordinary people who bring them business through their precious word-of-mouth. They can now do it without having to take part into a traditional MLM industry that has developed a specific and very real expertise in training and motivating large groups of small entrepreneurs. They can do it without being associated with an industry for which the vast majority of participants drop out and possibly loose significant investment in money and time.

More specifically, the DCCP data processing system subject of this invention has the following advantages:

a) it guarantees that, if a participant has introduced more than one person who developed sub-groups of customers, an increment in a particular sub-group's business volume will generate an increment in his/her net compensation. In other words, it effectively redistributes the available margin by always motivating participants to introduce more people to the offer over time;

b) each participant is remunerated for the marginal contribution that s/he makes to the business volume of his/her group (fair and transparent rule);

c) since the DCCP data. processing system is effective, there is no need for imposing performance conditions in order to pay compensation of participants;

d) since the DCCP data processing system does not impose performance conditions, it does not provide short term incentive to purchase unwanted products or to introduce dummy participants;

e) since the DCCP data processing system is effective, it always uses the same 3-steps calculation method (Differential method with a Continuous mathematical function) for all participants regardless of their position in the generations tree, the time they have been involved, their group business volume, etc.;

f) since the DCCP data processing system always uses the same calculation method, it is understandable for the layperson and explainable on a single leaflet;

g) since it can effectively be explained on a leaflet, it does not require additional training or motivation sessions or seminars;

h) since it does not require any additional training or motivation, it can be offered for free (no entry barriers) and the time and effort required from participants are very significantly reduced;

i) since the required investment in time and effort is small compared to the potential gains, participants to DCCP do not have to be small entrepreneurs (people who have money and time to spend on a small business venture); they can simply be consumers who perform a task similar in intensity to natural word-of-mouth;

j) since there is no need to have a specific expertise in training and motivating large groups of entrepreneurs, DCCP allows any company that wants to communicate and/or distribute an offer to final consumers to adopt MLM as a marketing approach. It can also be seen as a new kind of incentive program to effectively acquire and keep new business;

k) for those companies who never used MLM as a marketing approach, DCCP allows them to reduce their communication budgets by communicating more effectively (personal communications by ever-growing number of channels) and by making all participating customers loyal (new economic rapport with them);

l) for those companies who never used MLM as a marketing approach, DCCP allows them to reduce the financial risk of communicating by spending marketing budgets only after the acquisition of business;

m) for those companies who currently use MLM as a marketing approach, DCCP allows them to significantly broaden their target market (no entry barriers, no entrepreneurial requirements). It also offers tremendous benefits to their current participants who may find it difficult to find other participants with an entrepreneurial profile;

n) for those companies who currently use MLM as a marketing approach, DCCP allows them to significantly reduce their operations costs (no training or motivation infrastructure necessary);

o) for those companies who currently use MLM as a marketing approach, DCCP allows them to significantly reduce attrition rates and improve good conduct (less social pressure and sectarian attitude since there is nothing to lose and everything to gain for participants);

SUMMARY OF THE INVENTION

This invention provides a data processing system for monitoring and recording the information flow and data, and making all calculations necessary for maintaining a Differential Continuous Compensation Plan (DCCP) for participants to a Multi-Level Marketing (MLM) or Network Marketing approach.

To participate, i.e. to be compensated periodically for the purchases of a group of people, every participant must register and provide the operator with the name or ID number of another participant who personally introduced him/her to the offer. For each participant, the DCCP data processing system allows the calculation of periodic (usually monthly) compensation based on the total purchases of a group of other participants. A participant's group is made of every participants that he introduced to the offer directly and indirectly (i.e. through everyone, at infinitum, whose word-of-mouth can be traced back to him). Firstly, the DCCP data processing system adds up the monthly transactions of a participant's group to determine his/her business volume. Such business volume is then multiplied by a margin that continually increases (tends to reach a maximum set in advance) along with the business volume to determine a gross compensation. The net compensation is equal to the participant's gross compensation minus the gross compensation of the participants that s/he has personally introduced.

In order to calculate participants' compensation and unlike any other MLM compensation plans, the DCCP data processing system always uses the same Differential method for each and every participant, no matter how long they have been involved with the MLM program or what their level of performance is. Contrary to other methods of calculation (Semi Differential and Non-Differential), the Differential method has the undeniable advantage of isolating one's marginal contribution in a diffused and collective process such as word-of-mouth. In the context of limited financial resources, such method has the major advantage of isolating one's marginal contribution in a collective and diffused effort such as word-of-mouth. All other things being equal, Non-Differential MLM compensation plans (Unilevel, Binaries, Matrix) tend to underpay participants who make big individual efforts and they tend to overpay those who make small efforts. Since they naturally encourage individual apathy (participants have an economic interest in waiting for the others to introduce more participants), they generally constrain participants to meet minimum levels of performance in order to be compensated.

The single use of a Differential method is absolutely original and it is made possible by the integration in the DCCP data processing system of a Continuous mathematical function that associates bigger business volumes with bigger margins up to a maximum margin set by the operator (f(margin, volume) is asymptotic). In order to be appropriate for an MLM compensation plan, such Continuous function must fulfil two conditions (refer to FIG. 3):

$$\forall V>0 \,\forall X>0 \, A+E>D \quad \quad 1.$$

$$\forall V>0 \,\forall X>0 \,\forall W>0 \, B+C>D-A \quad \quad 2.$$

Condition 1 guarantees that the Continuous function does not give more margin than what is made available by the operator (fixed margin). Condition 2 guarantees that, if a participant has introduced more than one person who developed sub-groups of customers, an increment in a particular sub-group's business volume will generate an increment in his/her net compensation (motivation). Note that when a participant has reached the asymptotic part of the function (at that point, s/he has very high volumes calling for very high margins), the additional compensation generated by the function on a specific volume increment may not always translate in significant monetary value but it will never be negative. In other words, Condition 2 ensures that the inevitable loss in margin differential (the margin applied to the volume of sub-groups necessarily grows faster than the participant's margin when the latter has reached the asymptotic part of the function) will be fully compensated by the gain in volume differential. Such delicate and complex balance concretely means that for a given group, a participant's net compensation can never decrease over time. Note that such decrease is inevitable when F(margin, volume) is not continuous as is the case with Stair-Step functions commonly used in Stair-Step/Break Away plans (70% of MLM plans in existence). It explains why SSBA plans also have a Non-Differential component to them. Such component is meant to provide additional motivation to those who have reached the last step of the Stair-Step function but, as we have seen before, Non-Differential methods have their own flaws in addition to adding tremendous amounts of complexity to the plans.

In short, the DCCP data processing system brings two new dimensions to the state-of-the-art in MLM. It defines a family of Continuous mathematical functions that constantly and continually motivate participants to introduce more people to the offer. It always uses the same three-step Differential method which, in conjunction to the use of such Continuous function, determines a net compensation that reflects the marginal contribution of participants. Doing so, it effectively meets MLM's challenge to redistribute a fixed margin among a growing number of people while always motivating them, individually and collectively, in introducing more people to the offer over time.

There is therefore provided a data processing system for managing a Differential Continuous Compensation Plan for a plurality of participants to an MLM or network marketing approach which comprises:

a) computer processor means for processing data;
b) storage means for storing data on a storage medium;
c) means for initializing the storage medium;
d) first means for processing data regarding the registration of each participant and the generation of a specific ID number for each such participant;
e) second means for processing data to ensure that any new participant is introduced by a previously registered participant;
f) third means for processing data regarding the individual purchases of each participant;
g) fourth means for processing data regarding the total purchases of the entire group of each participant;
h) fifth means for processing data to determine the margin applicable to the said total purchases and other predetermined criteria;
i) sixth means for processing data to determine the gross compensation payable to each participant;
j) seventh means for processing data regarding the net compensation of each participant.

There is further provided a data processing system as described above further comprising:

a) first means for inputting and storing pricing data on the storage medium;
b) second means for inputting and storing data regarding purchase volumes in respect of each participant on said storage medium;
c) means for storing the identity of each said participant and his/her relationship with each previous level participant and each subsequent level participant on said storage medium.
d) eighth means for processing data using a differential method of calculation which comprises the use of a continuous function to determine the margin applicable to specific business volume.

In a preferred embodiment, said function must respect the following two conditions:

Condition 1: Resource Limitation $$\forall V>0 \,\forall X>0 \, A+E>D$$

Condition 2: Permanent Motivation $$\forall V>0 \,\forall X>0 \,\forall W>0 \, B+C>D-A$$

Where
V=group business volume of a given participant prior to adding X;
X=increase in group business volume of said given participant.
W=group business volume of said participant prior to adding X and exclusive of V. In other words, W is the business volume of the other sub-groups of P plus said participants own purchases.
M=the maximal margin that an operator wished to redistribute to pay for the effect of all the participants' word-of-mouth.

A=X(M(V+W+X)−M(V+X)) or the gain realized by the said participant on the volume increment X.

B=(M(V+W+X)−M(V+W)) or the gain realized by said participant due to margin increment broug,ht by X on W.

C=V(M(V+W+X)−M(V+W)) or the gain realised by P due to margin increment brought by X on V.

D=V(M(V+X)−M(V)) or the gain realised by Q P due to margin increment brought by X on V. It is also a loss for P since the gains of Q are taken off P's compensation.

E=X(M−M(V+W+X)) or the margin that is not being redistributed by the function.

F=X M(V+X) gain realised by Q on the volume increment X.

G=G=X (M−M(V+X))=E+A

DESCRIPTION OF THE DRAWINGS

FIG. 2 shows the formulas of the differential method of compensation calculation.

DETAILED DESCRIPTION OF A PREFERRED EMBODIMENT

Figure 1:
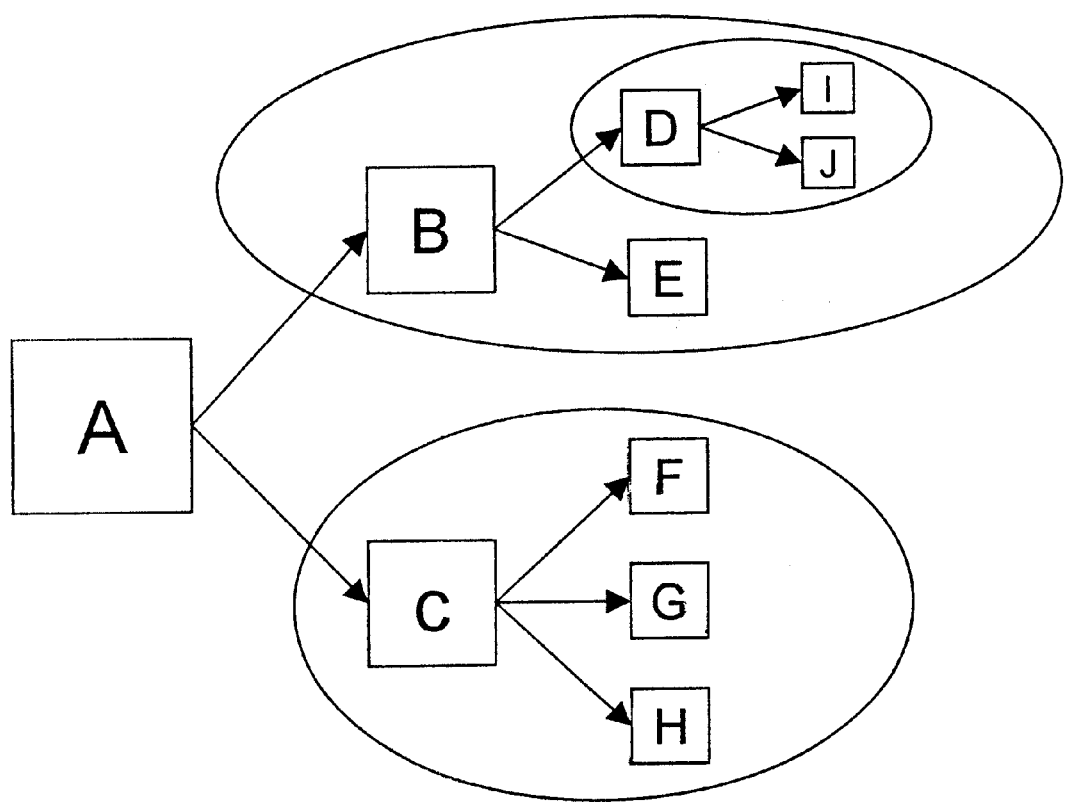
FIG. 1 is a general representation of the mechanism for group development.

As shown in FIG. 1, one's group is made of all of those participants that one directly or indirectly (through other participants) introduced (at infinitum) to the offer. It shows how the groups of different participants are included into one another.

Participant A has a group made of himself, participants B and C and their respective groups.

Participant B has a group made of himself, participants D and E and participant D's group.

Participant C has a group made of himself, participants F, G and H.

Participant D has a group made of himself and participants I and J.

Participant E has a "group" made of himself only.

Participant F has a "group" made of himself only.

Participant G has a "group" made of himself only.

Participant H has a "group" made of himself only.

Participant I has a "group" made of himself only.

Participant J has a "group" made of himself only.

It can thus be seen that group A is made of A and everyone that has been directly (B, C) and indirectly (D, E, F, G, H, I, J without limit) introduced to the offer by A. Also note that the participants constituting group A are simultaneously part of other groups. In fact, participants are part of as many groups as there are upline generations between themselves and the first participant. In FIG. 1, J is simultaneously part of four different groups (his own, D's, B's, and A's). Such group development mechanism means that a group may grow even if its leader stopped introducing others to the offer. It allows participants to benefit from the effort of a growing number of people (at infinitum) and provides participants with a truly unique economic opportunity (in a capitalistic economic system, ordinary people who do not hold capital are not in a position to benefit from the efforts of others).

The method shown in FIG. 2 includes three simple steps where:

Step 1 Determination of Group Business Volume $\lambda$k and $\mu$=two participants, p having introduced $\lambda$;

$V^\mu_\lambda$=total Business Points (units of Business Volume) of $\lambda$'s group;

$V_\lambda$=Business Points purchased by $\lambda$ himself;

$N_\lambda$=number of participants personally introduced by $\lambda$.

Step 2: Determination of Gross Compensation $M(V^\mu_\lambda)$=the margin associated to a Group Business Volume $V^\mu_\lambda$ by a Continuous mathematical function as presented in FIG. 3

$F(V^\mu_\lambda)$=Gross compensation

Step 3: Determination of Net Compensation $P(V^\mu_\lambda)$=Net compensation of participant $\lambda$ One's gross compensation is the result of one's group business volume multiplied by a margin and one's net compensation is the result of one's gross compensation minus the gross compensation of his direct sub-groups. Given the fact that one's group is constituted by his sub-groups (FIG. 1), if one has more than one sub-group, one's business volume will necessarily be bigger than those sub-groups taken individually. Further, if a Continuous mathematical function associates higher margins with bigger volumes, one's applied margin will also necessarily be higher than the one of his sub-groups taken individually. Such method of calculation constantly authorizes two sources of differential. This cannot be achieved by non-continuous mathematical functions (e.g. Stair-Step).

The DCCP method of the invention isolates one's marginal contribution in a collective process. Its very mechanic clearly suggests that, in order to maximize monetary gains, one must introduce as many participants as possible who, in turn, will create sub-groups of participants. As a corollary, it clearly suggests that if one introduces only one participant, his business volume will be similar to his sub-group (except for his own purchase), the applied margin will be similar and therefore, the differential between the two will be negligible. Although the DCCP method compensates only those who have created more than one sub-groups, it does not oblige one to introduce a large number of participants in order to make a significant compensation. In fact, having only two sub-groups that perform equally well is sufficient to generate significant business volume differentials, significant margin differentials and therefore, significant net compensation. In summary, the constant use of a DCCP method allows participants to constantly seek their individual interest in ensuring that the people that they personally introduce understand the benefits of building groups of customers. It generates a very natural rule of conduct that serves the interest of both the participants (the system pays more for those who make an effort) and the operator (the system pays out only when it has more customers who buy).

Figure 3:
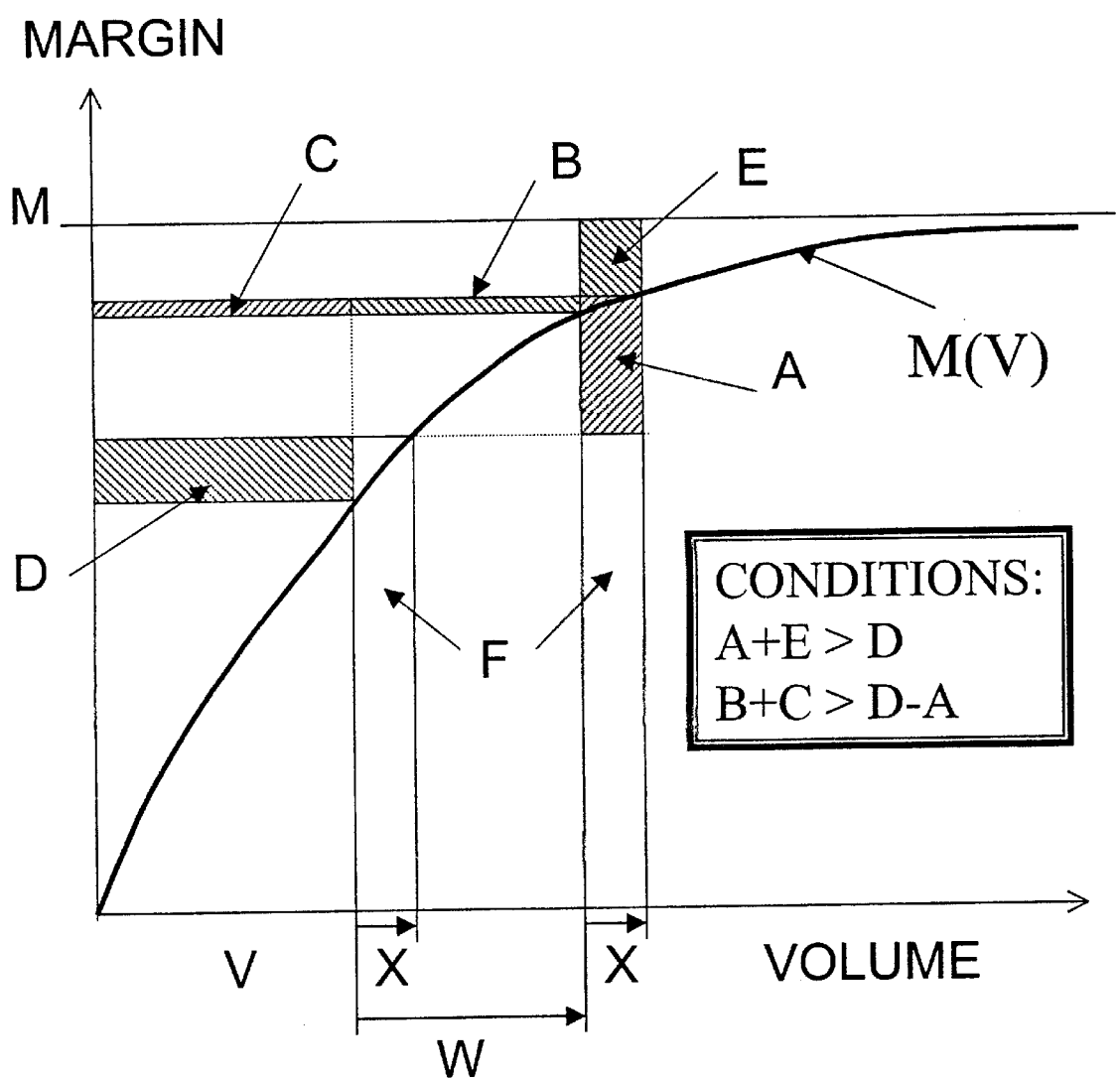
FIG. 3 illustrates a Continuous mathematical function and the two conditions that such function must respect.

FIG. 3 illustrates the monetary flows that are generated when a participant has one of his sub-groups that increases its business volume. In FIG. 3:

M=the maximal margin that an operator wishes to redistribute to pay for the effect of the participants' word-of-mouth.

P=a participant who has developed a group of participants made of many sub-groups.

Q=a particular sub-group of P.

V=business volume of Q prior to the increase by X.

W=business volume of P prior to the increase by X and exclusive of V. In other words, W is the business volume of the other sub-groups of P plus P's own purchases.

X=increment of Q's business volume.

A=X(M(V+W+X)−M(V+X)) or the gain realised by P on the volume increment X.

B=W(M(V+W+X)−M(V+W)) or the gain realised by P due to margin increment brought by X on W.

C=V(M(V+W+X)−M(V+W)) or the gain realised by P due to margin increment brought by X on V.

D=V(M(V+X)−M(V)) or the gain realised by Q P due to margin increment brought by X on V. It is also a loss for P since the gains of Q are taken off P's compensation.

E=X(M−M(V+W+X)) or the margin that is not being redistributed by the function.

F=X M(V+X) gain realised by Q on the volume increment X.

G=X(M−M(V+X))=E+A

A+E>D Condition 1 guaranteeing that the system will not redistribute more money than what is available.

B+C>D−A Condition 2 guaranteeing that if a participant introduced more than one person who developed a group of customers, an increment in his business volume will generate an increment in his compensation.

The choice of a specific Continuous mathematical function to determine the applicable margin is critical to the effective application of a Differential method. In order to meet MLM's challenge as defined before, such function M(V) must. fulfil the following conditions:

Condition 1: Resource Limitation $$\forall V>0 \forall X>0 G>D(=>E>B+C)$$

Condition 2: Permanent Motivation $$\forall V>0 \forall X>0 \forall W>0 B+C>D-A$$

The definition of the appropriate conditions to be met by the function could not have been formulated without the following analysis.

For a business volume increment X, the operator is willing to redistribute a margin M X=F+A+E. For P, the business volume increment X brought by Q generates a gross compensation equal to F+A+B+C. For Q, the same business volume increment X generates a gross compensation equal to D+F. The resulting net compensation for P is F−F+A−D+B+C. Below, we show that the relationships between A, D, C and B do not only depend on X but they also depend on W:

1. When W is small, A is small and therefore D−A is positive. Concretely, since the margin grows faster for Q than for P, the margin increment generated by X is larger for Q than for P. This creates a net loss (D−A) for P. In order to compensate for this loss, P must benefit from a margin differential on W and V (B+C). In order to guarantee that an increment of X is beneficial to P, B+C>D−A(C2). Moreover, on an increment of X, the operator redistributes a maximum of X M=A+F+E. Since A+F is already redistributed between P and Q, it is necessary that E>B+C(C1).

2. When W is large, the margin applicable to P is close to the maximum margin and E is small. Since E>B+C (C1), B+C is also small or in other words, the resources available for redistribution are scarce. However, when W is large, A is closer to G. Since G=A+E, G>D(C1) and since G and D do not depend on W, there is a level from which A must be larger than D (D−A is negative) and where D−A does not represent a loss for P anymore. From that point onward, (C2)B+C>D−A is trivial.

A Continuous function that meets the above conditions will first generate gross compensation from existing business volumes (V and W) rather than from the increment X. This source of differential however tends to fade away as both the participant and his sub-groups reach higher levels of margins. In this process, margin differential diminishes up to a point where significant growth in compensation can only come from a more direct source, i.e. from the differential that one would make on a new sub-group. Even though marginal returns tend to saturate (the marginal increase in margin on X reaches a point where it does not translate in significant monetary value), such function nonetheless ensures that those who have reached very high levels of margin keep their high level of compensation as their group continues to buy products. Unlike SSBA plans, there cannot be a net loss of differential for participants (reduction of compensation for a given group). Participants always have an economic interest to introduce more participants even when they make big compensation.

The DCCP data processing system can be used by any company that wishes to stimulate its consumers' word-of-mouth by remunerating it. A particular operational constraint in relation to the implementation of DCCP is the necessity to inform participants, on a regular basis, on the development of their groups and the related compensation. For companies who do not have a direct link with its consumer basis (consumer cards, private label credit cards, loyalty programs, etc.), this constraint might represent an additional implementation cost (regular mailing, internet or telephone systems). However, for companies that maintain a constant rapport with individual consumers (e.g. credit cards, electronic commerce, telecommunications, utilities, retailers with royalty programs, etc.), the implementation of DCCP is very straightforward and does not imply significant indirect costs. For once, such company can give ordinary people (not home entrepreneurs who have money and time to invest) the privilege to be compensated on the purchases of others. The only thing that those people have to do is to register themselves and pass a simple leaflet along to their peers. Below we present a concrete example of an application of the DCCP data processing system for a credit card.

EXAMPLE 3

Application to a Credit Card System

Suppose that a bank wants to remunerate its consumers for the word-of-mouth that they make in favor of its credit card. The goal of the bank is to attract new and loyal customers for its credit cards without having to invest enormous sums of money into financially risky mass marketing efforts (in 1997, 30 billion solicitations were made in the US for approximately 150 million potential credit card users). Suppose that the bank's credit card offers exactly the same features as its competitors except for this new reward program implemented thanks to the DCCP data processing system. For the potential customer, this unique reward program redistributes a fixed margin not only based on their own purchases but also on the purchases of everyone that they directly or indirectly introduce to the card over time (no obligations). Everyone who takes the card registers with the program. Those customers who do not wish to introduce others are remunerated based on their own purchases (their group is made of themselves) and those who introduce others are remunerated, each month, for the purchases of the sub-groups that those people develop, over time, at infinitum.

The first thing that the bank must determine prior to implementing the DCCP data processing system is the specific continuous mathematical function that associates specific margins to specific business volumes. For this example, we suggest to use the following function:

$$\text{Margin} = 0.005 - \frac{175}{\text{Business Volume} + 35{,}000}$$

Such function meets the two conditions mentioned earlier in order to be effective in meeting MLM's challenge. The proof is presented below:

Condition 1 (G>D) is the equivalent of:

$$G - D = \frac{6{,}125{,}000\, X}{(V + X + 35{,}000)(V + 35{,}000)} > 0$$

and this is obviously true

Condition 2 (B+C>D−A) is the equivalent of:

$$A + B + C - D = \frac{6{,}125{,}000\, W\ X\ (2V + W + X + 70{,}000)}{(V + W + X + 35{,}000)(V + W + 35{,}000)(V + X + 35{,}000)(V + 35{,}000)} > 0$$

and this is obviously true.

Potential participants are introduced to both the concept and the card by a single leaflet (paper or electronic) presented to them by a participant that they know. The participant invites the potential participant to read the leaflet for his own benefit. Such leaflet will be read because it is introduced by a personal contact as an awesome offer (regular credit card with the added possibility of making hundreds of dollars each month, forever, without having to invest money or significant amounts of time . . . ). Such leaflet obviously stands a much better chance to be read than if it had been anonymously delivered in the mail along with all the other solicitations.

The writing of the leaflet is critical to the understanding of ordinary people. It must be as clear and as concise as possible. It starts by explaining to potential participants that they can be remunerated, each month, for every dollar placed on the credit cards of those that they directly or indirectly introduce to the credit card of the bank. Then, it graphically describes the notion of group development. It clearly shows that it is easy (others help you develop your group) and quick to develop a large group as long as everyone makes a small effort. Then it presents the potential participants with a Compensation Table that shows how much money they could make depending on the size of their group and on how many people they have personally introduced into that group. Below, we present an example of such Compensation Table based on real-life assumptions (in the leaflet, assumptions are clearly written in introduction to the Compensation Table):

ASSUMPTION 1: Each month, the bank redistributes 0.5% of the total volume of transaction placed on its credit card during such month.

ASSUMPTION 2: Participants place $500 on their credit card each month (North American average).

ASSUMPTION 3: Participant's sub-groups are equivalent in size (people personally introduced by the participant are performing equally).

Monthly Compensation Table

| Group size: | Number of people that you personally introduced: | | | | |
|---|---|---|---|---|---|
| | 1 | 2 | 4 | 8 | 16 |
| 17 | $1 | $4 | $6 | $7 | $8 |
| 33 | $1 | $12 | $18 | $22 | $24 |
| 65 | $2 | $28 | $48 | $62 | $70 |
| 129 | $2 | $56 | $109 | $150 | $176 |
| 257 | $2 | $91 | $199 | $304 | $386 |
| 513 | $2 | $123 | $301 | $517 | $727 |
| 1,025 | $2 | $147 | $388 | $744 | $1,176 |
| 2,049 | $2 | $161 | $449 | $933 | $1,643 |
| 4,097 | $2 | $169 | $486 | $1,062 | $2,029 |

The production of such table has tremendous advantages in terms of explaining the system and making an individual interested in the system. The rows of the table clearly show the advantage of having a bigger group, i.e. the economic interest of ensuring that each participant that one personally introduces develops his/her own sub-groups of customers. The columns of the table clearly show the economic interest of personally introducing as many people as possible in a given group. In short, such table allow potential participants to naturally understand what they have to do in order to move to the bottom right of the table and get very high compensation. The underlying rule for compensation is fair and clear: participants are paid for both their individual and collective performance and one necessarily comes with the other.

No other MLM compensation plans, be they Non-Differential (Unilevel, Matrix, Binaries) or Semi-Differential (SSBAs) can produce such Compensation Table. For a given group size, Non-Differential plans cannot guarantee that gross compensation will significantly increase along with the number of participant personally introduced (personal effort). For a given number of participants personally introduced, SSBAs cannot guarantee that gross compensation will constantly increase along with the group size.

The Compensation Table is crucial as a didactical tool but it is not precise in explaining how the compensation is calculated. As shown in the next paragraph, the leaflet also explains the DCCP method that is applied to determine the net compensation and it provides a specific example (maintains earlier assumptions).

At the end of each month, the bank calculates participant's Net Compensation in three simple steps:

1. It adds-up the monthly transactions of everyone in a participant's group to determine his Group Business Volume.
2. It multiplies the Group Business Volume by a Margin that varies between 0% and 0.5% to determine the Gross Compensation. The margin that is used increases along with the Group Business Volume even if the latter increases by $1 only (the margin then increases very slightly).
3. Participant's Net Compensation=Participant's Gross Compensation−Gross Compensation of personal introductions.

Let's assume that a participant A has personally introduced the credit card opportunity to 4 friends who adhered to it and who, over time, have developed a group of 512 customers each. Participant A's group then includes 2,049 customers (4×512+A). At the end of that particular month, the bank will send A the following Compensation Statement:

| Compensation Statement | Volume × Margin = | Gross Compensation |
|---|---|---|
| A | $1,024,500[a] × 0.48%[c] = | $4,953.28 |
| (−) B | $256.000[b] × 0.44%[c] = | −$1,126.05 |
| (−) C | $256,000 × 0.44% = | −$1,126.05 |
| (−) D | $256,000 × 0.44% = | −$1,126.05 |
| (−) E | $256,000 × 0.44% = | −$1,126.05 |
| | Net Compensation = | $449.09 |

[a](2,049 customers × $500)
[b](512 customers × $500)
[c]Determined by a computerized mathematical function that guarantees that a bigger Business Volume is associated with a higher Margin. The formulae that determines the Margin applicable to specific volumes is as follows:

$$\text{Margin} = 0.005 - \frac{175}{\text{Business Volume} + 35,000}$$

What is claimed is:

1. A data processing system for managing a compensation plan for a plurality of participants to an MLM or network marketing approach wherein a profit margin is to be distributed among the participants said data processing system comprising:
   a) computer processor means for processing data;
   b) storage means for storing data on a storage medium;
   c) means for initializing the storage medium;
   d) first means for processing data regarding the registration of each participant and the generation of a specific ID number for each participant;
   e) second means for processing data to ensure that any new participant is introduced by a previously registered participant;
   f) third means for processing data regarding purchases of each participant;
   g) fourth means for processing data regarding the group purchases of each such participant which is the sum of the individual purchases of such participant and the individual purchases of all new participants which were introduced by such participant, or such new participants and so on;
   h) fifth means for processing data to determine the portion of said margin applicable to the said sum of purchases using a continuous differential method of calculation;
   i) sixth means for processing data to determine the gross compensation payable to each participant;
   j) seventh means for processing data regarding the net compensation of each participant.

2. A data processing system as claimed in claim 1, further comprising:
   a) means for inputting and storing on the storage medium pricing data;
   b) means for inputting and storing on the storage medium data regarding purchase volumes in respect of each participant;
   c) means for storing on storage medium the identity of each said participant and his/her relationship with each previous level participant and each subsequent level participant.

3. A data processing system as claimed in claim 2 further comprising the use of a continuous function to determine the portion of said margin applicable to specific purchases.

4. A data processing system as claimed in claim 1 further comprising the use of a continuous function to determine the portion of said margin applicable to specific purchases.

5. A data processing system as claimed in claim 4, wherein said function must respect the following two conditions:

Condition 1: Resource Limitation $$\forall V>0 \forall X>0 A+E>D$$

Condition 2: Permanent Motivation $$\forall V>0 \forall X>0 \forall W>0 B+C>D-A$$

where
V=group purchases of a particular sub-group of a given participant prior to adding X;
W=group purchases of said participant exclusive of V but prior to adding X. In other words, W is the purchases of the other sub-groups of said participant plus said participant's own purchases;
X=increase in group purchases of said given participant;
M=the maximal margin that the operator of the data processing system wishes to redistribute to pay for the effect of all the participants' word-of-mouth;
A=X(M(V+W+X)−M(V+X)) or the realized by the said participant on the volume increment X;
B=W(M(V+W+X)−M(V+W)) or the gain realized by said participant due to margin increment brought by X on W;
C=V(M(V+W+X)−M(V+W)) or the gain realised by said participant due to martin increment brought by X on V;
D=V(M(V+X)−M(V)) or the gain realised by said participant' sub-groups due to margin increment brought by X on V. It is also a loss for said participant since the gains of his sub-groups are taken off said participant compensation;
E=X (M−M(V+W+X)) or the margin that is not being redistributed by the function;
F=X M(V+X) gain realised by said participant's sub-groups on the volume increment X;
G=G=X(M−M(V+X))=E+A.

6. A data processing system for managing a compensation plan for a plurality of participants to an multi-level marketing or network marketing approach wherein a predetermined compensation is to be distributed among the participants, said data processing system comprising:
   a) computer processor means for processing data;
   b) storage means for storing data on a storage medium;
   c) means for initializing the storage medium;
   d) first means for processing data regarding the registration of each participant and the generation of a specific ID number for each participant;
   e) second means for processing data to ensure that any new participant is introduced by a previously registered participant;
   f) third means for processing data regarding business volume generated by each participant;
   g) fourth means for processing data regarding the group business volume of each such participant which is the sum of each individuals business volume of such participant and the individual business volume of all new participants which where introduced by such participant, or such new participants and so on;

h) fifth means for processing data to determine the portion of said compensation applicable to the said total sum of business volume using a continuous differential method of calculation;

i) sixth means for processing data to determine the gross compensation payable to each participant;

j) seventh means for processing data regarding the net compensation of each participant.

7. A data processing system as claimed in claim 6, wherein said function must respect the following two conditions:

Condition 1 : Resource Limitation $$\forall V>0 \forall X>0 A+E>D$$

Condition 2: Permanent Motivation $$\forall V>0 \forall X>0 \forall W>0 B+C>D-A$$

where

V=group business volume of a particular sub-group of a given participant prior to adding X;

W=group business volume of said participant exclusive of V but prior to adding X. In other words, W is the business volume of the other sub-groups of said participant plus said participant's own business volume;

X=increase in group business volume of said given participant;

M=the maximal margin that the operator of the data processing system wishes to redistribute to pay for the effect of all the participants' word-of-mouth;

A=X(M(V+W+X)−M(V+X)) or the gain realized by the said participant on the volume increment X;

B=W(M(V+W+X)−M(V+W)) or the gain realized by said participant due to margin increment brought by X on W;

C=V(M(V+W+X)−M(V+W)) or the gain realised by said participant due to margin increment brought by X on V;

D=V(M(V+X)−M(V)) or the gain realised by said participant' sub-groups due to margin increment brought by X on V. It is also a loss for said participant since the gains of his sub-groups are taken off said participant compensation;

E=X(M−M(V+W+X)) or the margin that is not being redistributed by the function;

F=X M(V+X) gain realised by said participant's sub-groups on the volume increment X;

G=G=X(M−M(V+X))=E+A.

* * * * *